United States Patent
Kassai et al.

(10) Patent No.: US 7,140,634 B2
(45) Date of Patent: Nov. 28, 2006

(54) FOLDABLE BABY CARRIAGE

(75) Inventors: Kenzou Kassai, Osaka (JP); Ichiro Ohnishi, Nara (JP)

(73) Assignee: Aprica Kassai Kabushikikaisha, Osaka (JP)

( * ) Notice: Subject to any disclaimer, the term of this patent is extended or adjusted under 35 U.S.C. 154(b) by 254 days.

(21) Appl. No.: 10/753,095

(22) Filed: Jan. 6, 2004

(65) Prior Publication Data

US 2004/0164523 A1 Aug. 26, 2004

(30) Foreign Application Priority Data

Feb. 4, 2003 (JP) .............................. 2003-026602

(51) Int. Cl.
*B62B 7/06* (2006.01)

(52) U.S. Cl. ..................... 280/642; 280/647; 280/650; 280/42

(58) Field of Classification Search ................ 280/642, 280/644, 646, 647, 650, 657, 658, 47.25, 280/47.38; 297/16, 39, 42–45, 452.57
See application file for complete search history.

(56) References Cited

U.S. PATENT DOCUMENTS

| | | | |
|---|---|---|---|
| 3,989,295 A | 11/1976 | Sparkes | |
| 4,191,397 A * | 3/1980 | Kassai | ........................ 280/647 |
| 4,256,325 A | 3/1981 | Fleischer | |
| 4,515,389 A | 5/1985 | Kassai | |
| 5,181,735 A * | 1/1993 | Onishi | ........................ 280/642 |
| 5,201,535 A * | 4/1993 | Kato et al. | ..................... 280/30 |
| 5,358,263 A * | 10/1994 | Aldus et al. | .................. 280/42 |
| 5,676,419 A | 10/1997 | Kassai | |
| 5,752,738 A * | 5/1998 | Onishi et al. | .................. 297/61 |
| 5,820,144 A * | 10/1998 | Wang | ...................... 280/47.38 |
| 5,863,061 A * | 1/1999 | Ziegler et al. | .............. 280/642 |
| 5,988,670 A * | 11/1999 | Song et al. | ................. 280/648 |
| 6,000,713 A * | 12/1999 | Lin | ............................. 280/647 |
| 6,196,572 B1 * | 3/2001 | Durrin | ........................ 280/648 |
| 6,533,311 B1 * | 3/2003 | Kaneko et al. | ............. 280/647 |
| 6,601,865 B1 * | 8/2003 | Harper | ..................... 280/304.1 |
| 6,789,809 B1 * | 9/2004 | Lin | ........................... 280/47.25 |
| 6,820,891 B1 * | 11/2004 | Suga | ........................... 280/642 |
| 6,964,429 B1 * | 11/2005 | Suga et al. | ................. 280/642 |

FOREIGN PATENT DOCUMENTS

| | | |
|---|---|---|
| EP | 0697323 | 2/1996 |
| JP | 08058599 | 3/1996 |

* cited by examiner

*Primary Examiner*—Christopher P. Ellis
*Assistant Examiner*—Bridget Avery
(74) *Attorney, Agent, or Firm*—W. F. Fasse; W. G. Fasse

(57) ABSTRACT

A folding baby carriage comprises a pair of seating surface supporting side bars extending back and forth along both sides of a seating surface in order to support the seating surface from beneath. Each seating surface supporting side bar has a rigid inward extending portion extending toward the inside so as to support the seating surface from beneath, at a rear portion thereof. The inward extending portion is formed by bending a rear end portion of the seating surface supporting side bar toward the inside.

9 Claims, 11 Drawing Sheets

FOLDABLE BABY CARRIAGE

BACKGROUND OF THE INVENTION

1. Field of the Invention

The present invention relates to a folding baby carriage folded so as to be reduced in dimension in the width direction, and more particularly, to a folding baby carriage in which a rear portion of a seating surface is prevented from being dented.

2. Description of the Background Art

FIGS. 1 and 2 show a baby carriage disclosed in Japanese Unexamined Patent Publication No. 8-58599. FIG. 1 is an opened state of the baby carriage and FIG. 2 is a folded state of the baby carriage. As can be clear when FIG. 1 is compared with FIG. 2, when the baby carriage 1 is folded, four wheels 4 and 6 approach back and forth and from side to side.

The illustrated baby carriage 1 comprises a body 2 mainly constituted by bar-shaped members, and a seat hammock 3 mounted on the body 2 to form a seat. The baby carriage body 2 comprises a pair of front legs 5 having front wheels 4, a pair of rear legs 7 having rear wheels 6, a pair of handrail members 8 positioned above both sides of the seating surface, a pair of inverting members 9 turnably mounted on rear legs 7, and a push bar 10 having an inverted U-shaped configuration, connected to rear end portions of the pair of handrail members 8 and extending upward.

The push bar 10 has a pair of side vertical bars 11 linearly extending in the vertical direction so as to be parallel to each other, and an upper connection member 12 connecting upper ends of the pair of side vertical bars 11. The upper connection member 12 has a pair of rotating members 12a provided so as to receive the side vertical bars 11 and rotate around the side vertical bars 11, and a center member 12b connecting the pair of rotating members 12a. The rotating member 12a and the center member 12b are connected so as to be allowed to be bent as shown in FIG. 2.

A lower frame structure positioned above the four wheels 4 and 6 and forming a seating surface portion of a seat is folded so that the four wheels 4 and 6 may approach back and forth and from side to side. The inverted U-shaped push bar 10 extending to rise upward from both sides of the seating surface portion is bent forward by protruding the center member 12b forward to reduce the dimension in the width direction, in the folded state shown in FIG. 2.

The seat hammock 3 has a seat portion 3a and a backrest portion 3b. Normally, the seat hammock 3 is made of a sewed cloth and has a core inside.

FIG. 3 is a top view showing the seat portion 3a of the seat hammock 3. The body 2 of the baby carriage comprises a pair of seating surface supporting side bars 13 and 14 extending back and forth along both sides of a lower surface of the seat portion in order to support the seat portion 3a of the seat hammock 3 from beneath. As the baby carriage 1 is folded, the pair of seating surface supporting side bars 13 and 14 approach each other.

In order to implement the above folding operation, the front portions of the pair of seating surface supporting side bars 13 and 14 are connected by a bending link member 15 and rear portions are connected by a flexible belt 16. In the opened state of the baby carriage 1, the bending link member 15 takes a linear state to support the front portion of the seat portion 3a from beneath. In the meantime, in the folded state of the baby carriage 1, the bending link member 15 is bent upward so that the pair of seating surface supporting side bars 13 and 14 approach each other.

In the opened state of the baby carriage 1, the belt 16 is pulled by the pair of seating surface supporting side bars 13 and 14 and becomes in a tight state to support the rear portion of the seat portion 31 from beneath. In the meantime, in the folded state of the baby carriage 1, since the pair of seating surface supporting side bars 13 and 14 approach each other, the belt 16 becomes in a loose state.

According to the baby carriage disclosed in Japanese Unexamined Patent Publication No. 8-58599, the rear portion of the seat portion 3a of the seat hammock 3 is supported by the flexible belt 16. When a child is seated in the seat and weighs the rear portion of the seat portion 3a, the belt 16 is curved downward by the weight.

Therefore, while the baby carriage is used, the rear portion of the seat portion 3a is dented. As a result, the posture of the child cannot be appropriately maintained and a spine could be awkwardly bent or an abdomen could be pressed.

SUMMARY OF THE INVENTION

It is an object of the present invention to provide a folding baby carriage folded so as to be reduced in dimension in the width direction, capable of stably supporting a seating surface of the baby carriage in an opened state and appropriately supporting a seated posture of a child.

A folding baby carriage according to the present invention is folded so as to be reduced in a dimension in the width direction comprises a pair of seating surface supporting side bars extending back and forth along both sides of a seating surface in order to support the seating surface from beneath. Each seating surface supporting side bar has a rigid inward extending portion extending toward the inside so as to support the seating surface from beneath.

Since the rigid inward extending portion stably supports the seating surface from beneath, the seating surface is not dented so that the seated posture of the child can be appropriately maintained. Especially, in view of prevention of being dented at the rear portion of the seating surface, the inward extending portion preferably extends from a rear portion of the seating surface supporting side bar to the inside.

Preferably, each seating surface supporting side bar integrally has the inward extending portion. The seating surface supporting side bar may be constituted by a member different from that of the inward extending portion. In this case also, when both are integrally constituted, its rigidity is increased. As a result, the seating surface can be stably supported.

According to one embodiment, the inward extending portion is formed by bending a rear end portion of the seating surface supporting side bar to the inside in the shape of horseshoe. According to the seating surface supporting side bar having such configuration, the seating surface can be stably supported with a very simple structure.

As one example of a concrete embodiment, the baby carriage comprises a rear leg having a rear wheel, an inverting member turnably connected to the rear leg through a connection pin, provided along the rear leg above the connection pin in an opened state, and provided along the rear leg below the connection pin in a folded state, and a connection member turnably connected to the inverting member. Preferably, the seating surface supporting side bar and the connection member are fixed, and a portion extending backward of the seating surface supporting side bar beyond the connection member has been bent in the shape of horseshoe.

Preferably, a distance between the pair of inward extending portions positioned at right and left sides of the baby carriage in the opened state has a dimension corresponding to a distance in which the pair of seating surface supporting side bars approach each other in accordance with a folding operation. Such dimensional relation does not hinder the folding operation.

According to one embodiment, the baby carriage comprises a plate-shaped seating surface core forming the seating surface. Preferably, the seating surface core is connected to the pair of seating surface supporting side bars. According to such constitution, since the position of the seating surface core can be fixed and stably supported by the inward extending portion from beneath, the position of the seating surface can be surely stabilized. In this case, the seating surface core is preferably connected to the inward extending portion of the pair of seating surface supporting side bars.

In the above case, the seating surface core and the pair of seating surface supporting side bars are connected through a belt, for example. In addition, the baby carriage preferably comprises a bending link member connecting front portions of the pair of seating surface supporting side bars. The bending link member has a center link bar and a pair of side link bars provided so as to be allowed to be bent. The seating surface core is preferably connected to the center link bar.

DESCRIPTION OF THE PREFERRED EMBODIMENTS

Figure 1:
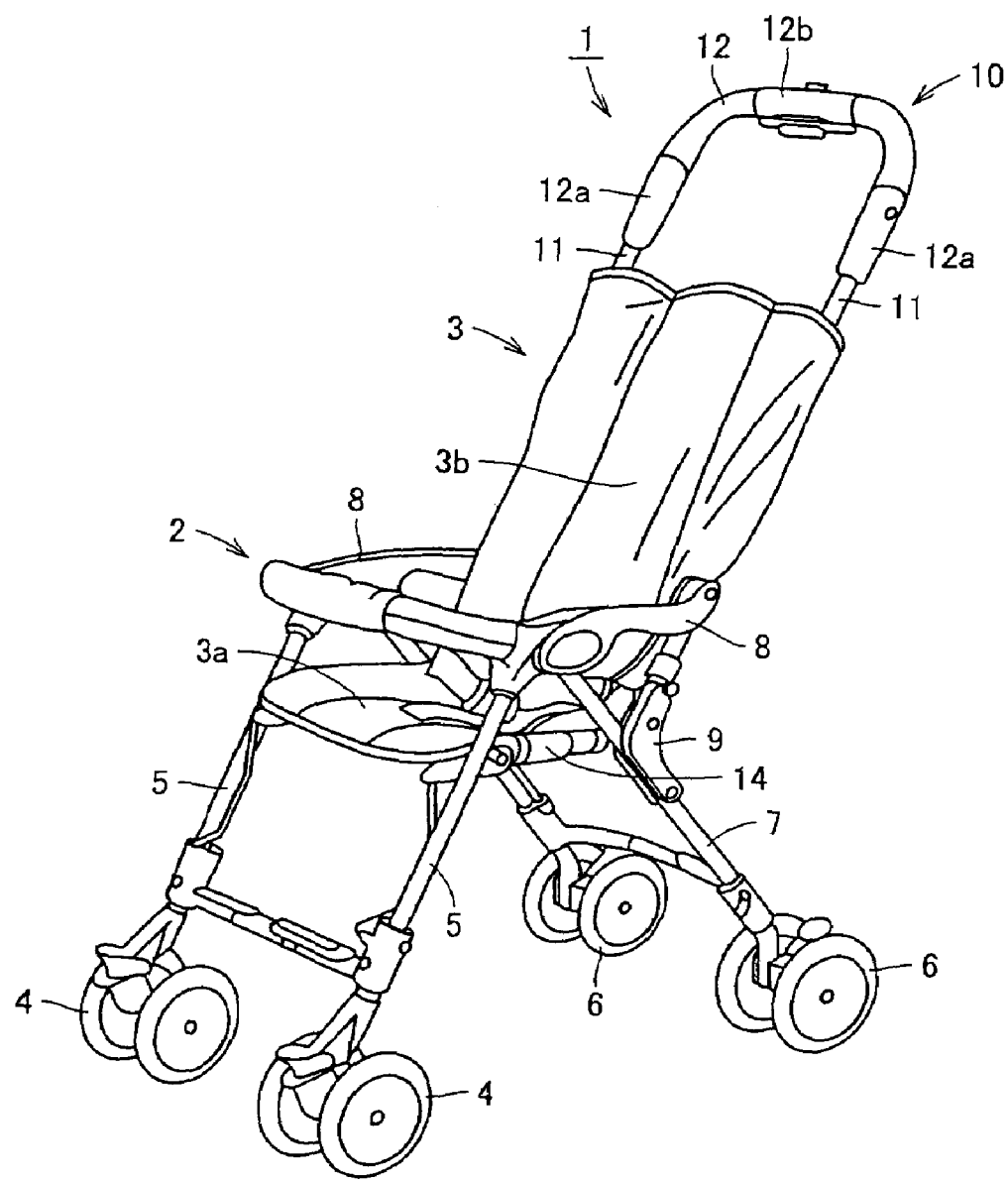
FIG. 1 is a perspective view showing a baby carriage disclosed in Japanese Unexamined Patent Publication No. 8-58599.
Figure 2:
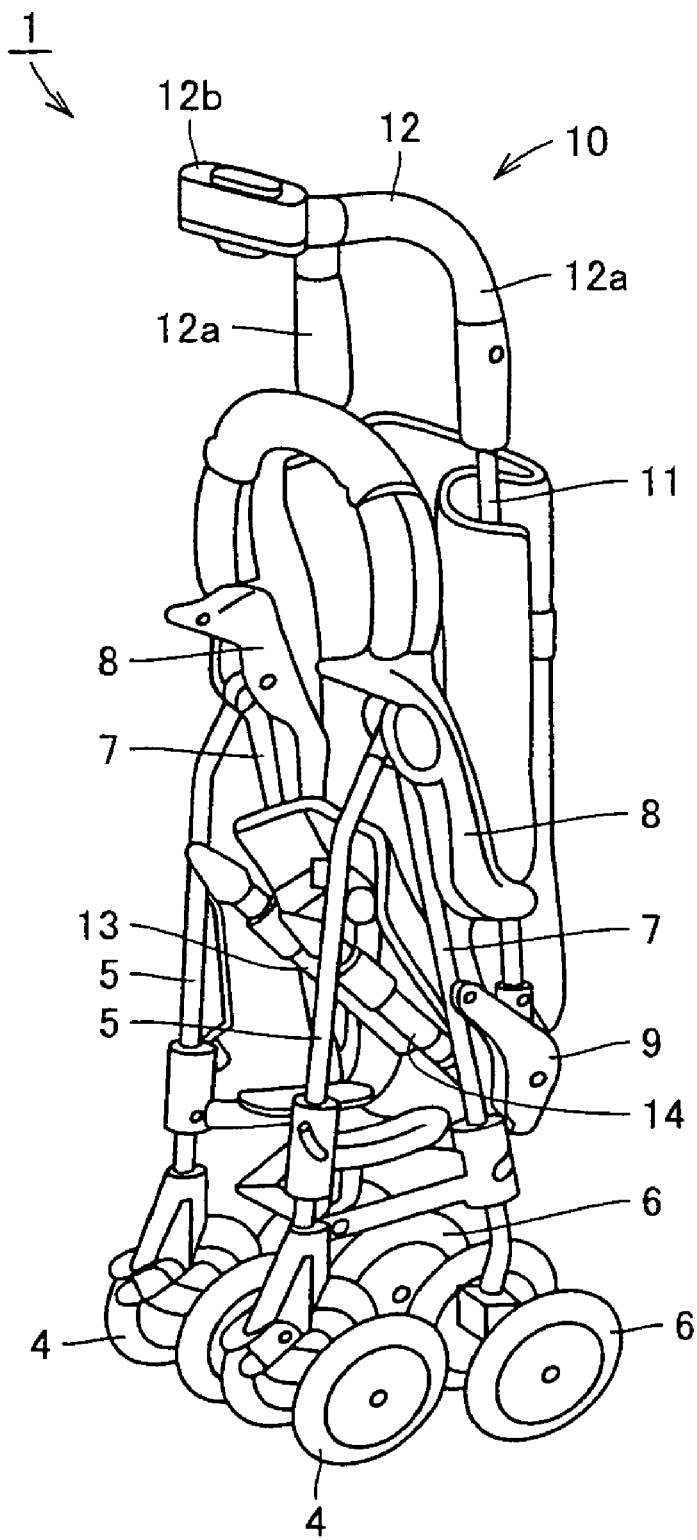
FIG. 2 is a perspective view showing a folded state of the baby carriage shown in FIG. 1.
Figure 3:
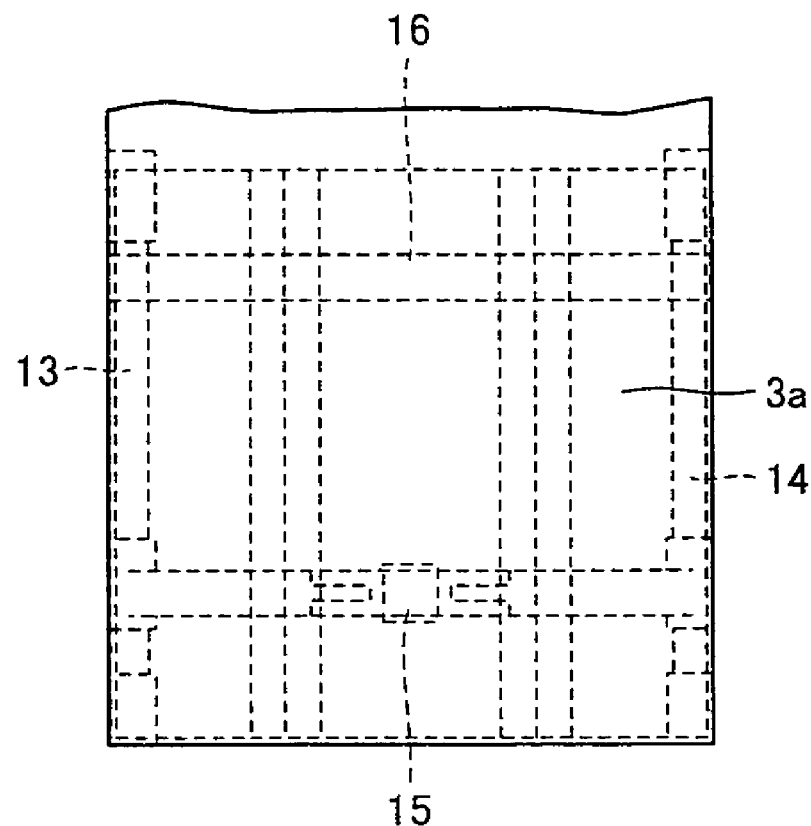
FIG. 3 is a top view showing a seat portion of the baby carriage shown in FIG. 1.
Figure 4:
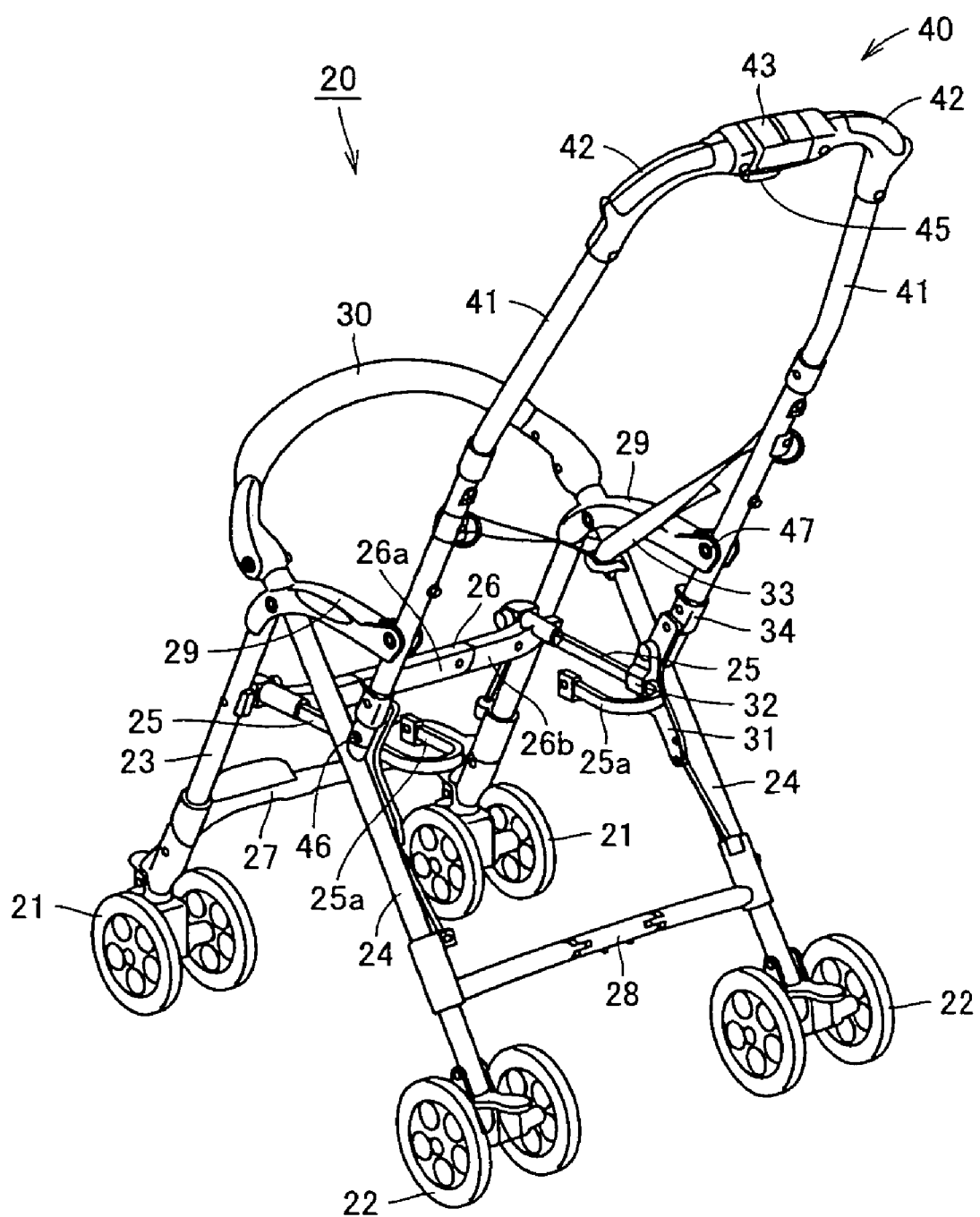
FIG. 4 is a perspective view showing a baby carriage according to an embodiment of the present invention.
Figure 5:
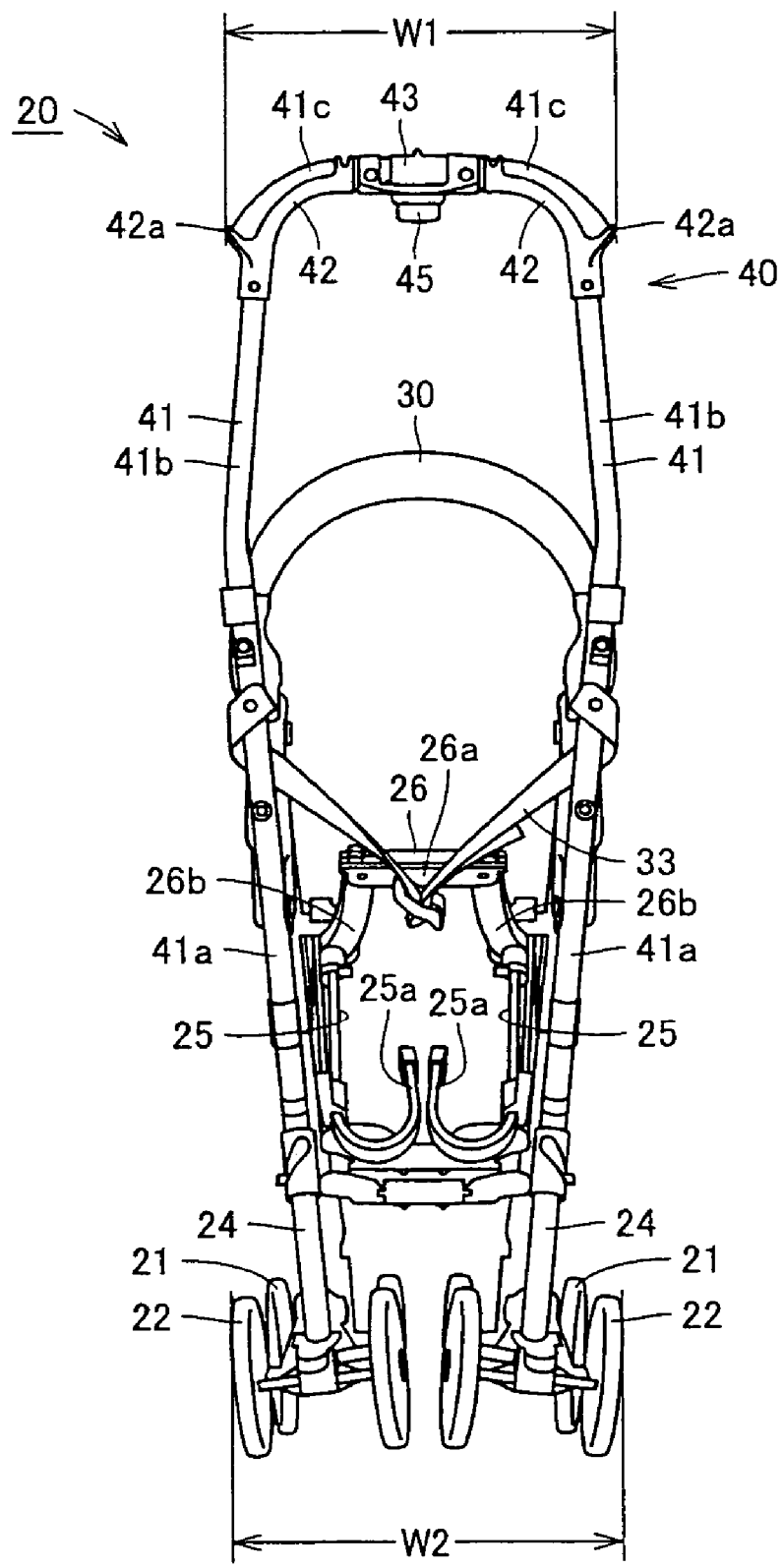
FIG. 5 is a back view showing a folded state of the baby carriage shown in FIG. 4.

One embodiment of the present invention is described with reference to the drawings hereinafter. FIG. 4 is a perspective view showing a baby carriage 20 and FIG. 5 is a back view showing a folded state thereof.

The illustrated baby carriage 20 is folded so that four wheels 21 and 22 approach each other back and forth and from side to side. As a basic frame structure, the baby carriage 20 comprises a pair of front legs 23 having front wheels 21, a pair of rear legs 24 having rear wheels 22, a pair of seating surface supporting side bars 25 extending back and forth along both sides of a seating surface in order to support the seating surface from beneath, a pair of handrail members 29 positioned above both sides of the seating surface, an inverted U-shaped push bar 40 extending to rise upward from both sides of the seating surface portion, a connection member 27 connecting the pair of front legs 23, a connection member 28 connecting the pair of rear legs 24, a front guard member 30 extending across the pair of handrail members, and a bending link member 26 connecting front ends of the pair of seating surface supporting side bars 25. In order to implement a folding movement of the baby carriage 20, an upper end portion of the front leg 23 and an upper end portion of the rear leg 24 are turnably connected to the handrail member 29, respectively. When the baby carriage 20 is folded, the front and rear wheels 21 and 22 approach each other.

Figure 6:
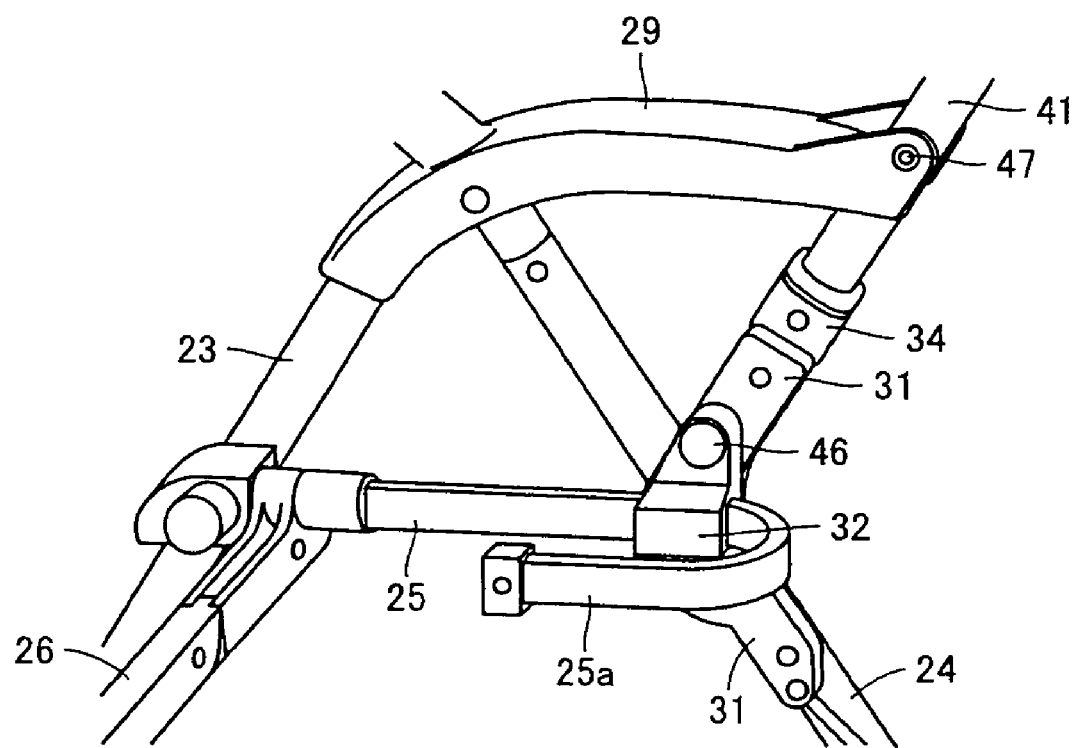
FIG. 6 is a perspective view showing a connection portion between a side vertical bar, a rear leg and a seating surface supporting side bar.
Figure 7:
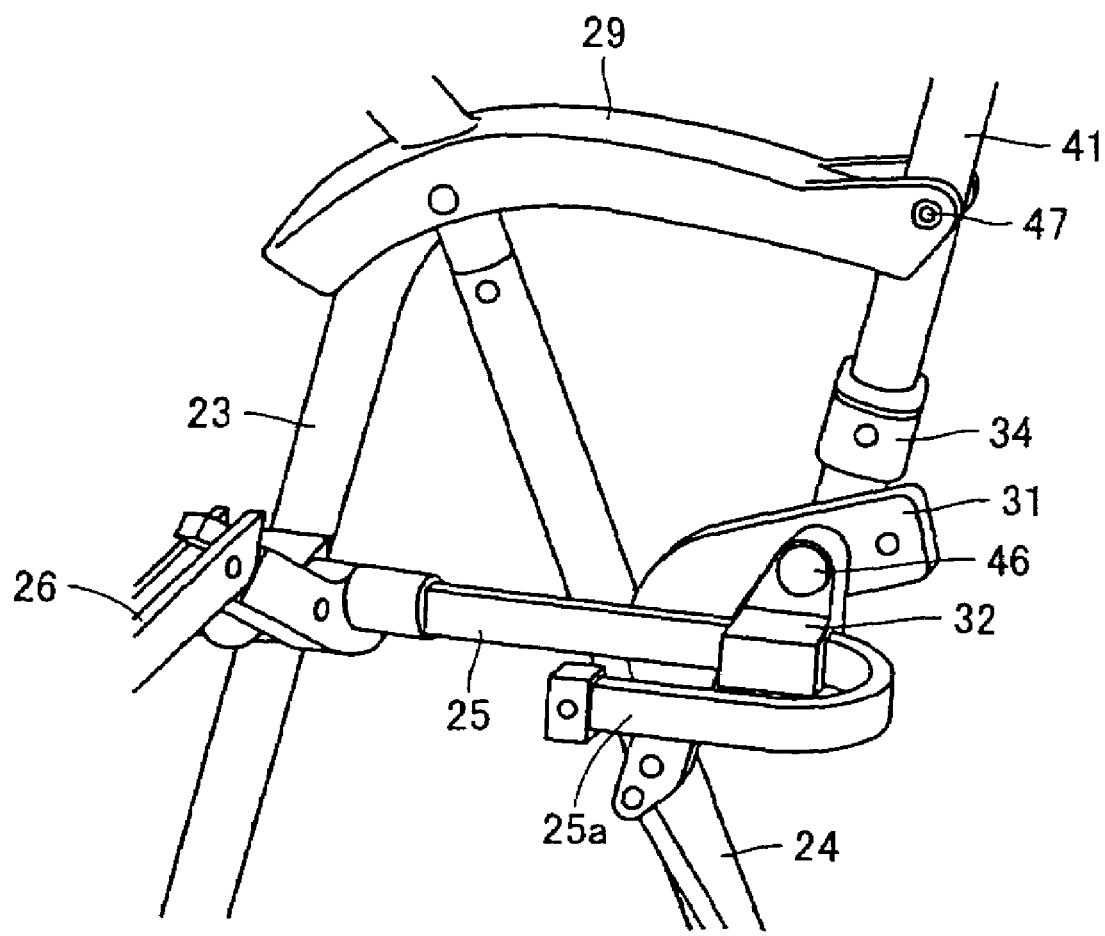
FIG. 7 is a view showing a state of the connection portion shown in FIG. 6 on the way to a folding operation.
Figure 8:
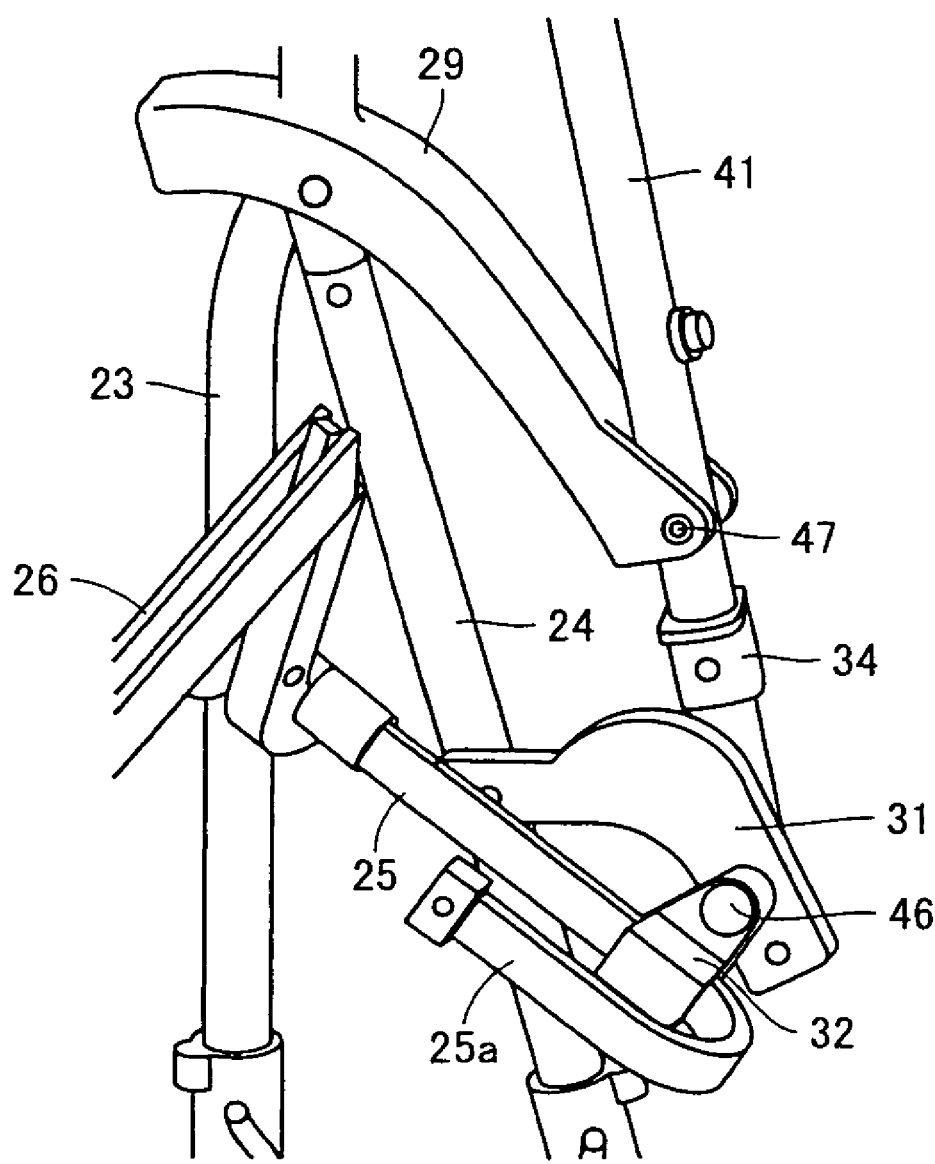
FIG. 8 is a view showing a folded state of the connection portion shown in FIG. 6.

The front end portion of the seating surface supporting side bar 25 is turnably connected to the front leg 23 and a rear end portion thereof is turnably connected to an inverting member 31 through a connection member 32 and a connection axis 46 (FIGS. 6 through 8).

The inverted U-shaped push bar 40 comprises a pair of side vertical bars 41 extending to rise upward from both sides of the seating surface portion and a middle bar 43 connecting the pair of side vertical bars 41. A cover member 42 is mounted on an upper portion of each side vertical bar 41. A rear end portion of the handrail member 29 is turnably connected to the side vertical bar 41 through a connection axis 47. Although a description is made in detail later, a lower end portion of the side vertical bar 41 is turnably connected to the inverting member 31 through the connection axis 46. As shown in FIGS. 4 and 5, a back surface belt 33 connects the pair of side vertical bars 41 so as to support a backrest portion of a seat hammock (not shown) from behind.

The bending link member 26 connecting the pair of seating surface supporting side bars 25 is provided so as to be allowed to be bent upwardly so that the right-and-left wheels may approach to reduce a dimension in the width direction at the time of a folding operation. More specifically, as shown in FIGS. 4 and 5, the bending link member 26 has a center link bar 26a and a pair of side link bars 26b which are connected so as to be allowed to be bent, and an outer end portion of each side link bar 26a can be turned around the seating surface supporting side bar 25.

Like the bending link member 26, the connection member 28 connecting the pair of rear legs 24 and the connection member 27 connecting the pair of front legs 23 are provided so as to be allowed to be bent. The front guard member 30 connecting the pair of handrail members 29 is formed of a flexible material so that the right-and-left ends thereof can approach each other in accordance with the folding operation.

Referring to FIGS. 6 through 8, a description is made of a connection structure between the side vertical bar 41 of the push bar 40, the rear leg 24 and the seating surface supporting side bar 25. Besides, a description is made of a configuration of the seating surface supporting side bar 25. FIG. 6 shows an opened state of the baby carriage, FIG. 7 shows a state on the way to the folding operation and FIG. 8 shows a folded state thereof.

The connection member 32 is fixed to the rear end portion of the seating surface supporting side bar 25. AS can be clear from FIG. 6, the seating surface supporting side bar 25 integrally has an inward extending portion 25a which extends inward, at a rear portion thereof. More specifically, the portion extending backward beyond the connection member 32 has been bent in a horseshoe shape to form the inward extending portion 25a. The inward extending portion 25a supports the seating surface from beneath. Since the rear portion of the seating surface is stably supported by the rigid inward extending portion 25a of the seating surface supporting side bar 25, there is no dented portion at the rear portion of the seating surface so that a posture of a child seated in the Beat of the baby carriage can be appropriately maintained. The inward extending portions 25a of the pair of seating surface supporting side bars are not connected to each other and do not extend all the way across the width direction between the side bars 25. Rather, the inward extending portions 25a are spaced apart from one another in the width direction in the unfolded state as shown in FIG. 4, and approach each other in accordance with the folding operation of the baby carriage as shown in FIG. 5. It is necessary to appropriately select the spacing distance between the right-and-left inward extending portions 25a so as not to hinder the folding operation and to reduce the dimension in the width direction in the folded state as much as possible. More specifically, the distance of the pair of inward extending portions 25a positioned in the opened state of the baby carriage has a dimension corresponding to a distance in which the pair of seating surface supporting side bars 25 approach each other in accordance with the folding operation. Therefore, as shown in FIG. 5, the right-and-left inward extending portions 25a are in very close contact with each other in the folded state of the baby carriage.

The inverting member 31 is turnably mounted on each rear leg 24 through a connection pin. In the opened state of the baby carriage shown in FIG. 6, the inverting member 31 is positioned above the connection pin along the rear leg 24 and in the folded state of the baby carriage shown in FIG. 8, the inverting member 31 is positioned below the connection pin along the rear leg 24.

The lower end portion of the side vertical bar 41 of the push bar 40 is turnably connected to an edge portion of the inverting member 31 through the connection axis 46. As can be clear when FIGS. 6 through 8 are compared, the connection axis 46 turnably connects the rear end portion of the seating surface supporting side bar 25, the edge portion of the inverting member 31 and the lower end portion of the side vertical bar 41.

A slide member 34 which can be slid in the vertical direction is provided at the lower end portion of the side vertical bar 41 of the push bar 40. The slide member 34 is connected to an operation button 45 (see FIG. 4) provided in the middle bar 43 of the push bar 40 through a wire passing through the push bar 40 so as to be operated by the operation button 45. When the operation button is operated, the slide member 34 can be moved upward. In addition, the slide member 34 is always forced downward by a spring although it is not shown.

In the opened state of the baby carriage shown in FIG. 6, the slide member 34 engages with the inverting member 31 to inhibit the movement of the inverting member 31. When the baby carriage is folded, the operation button 45 is operated to move the slide member 34 upward and the engagement between the slide member 34 and the inverting member 31 is released.

Figure 9:
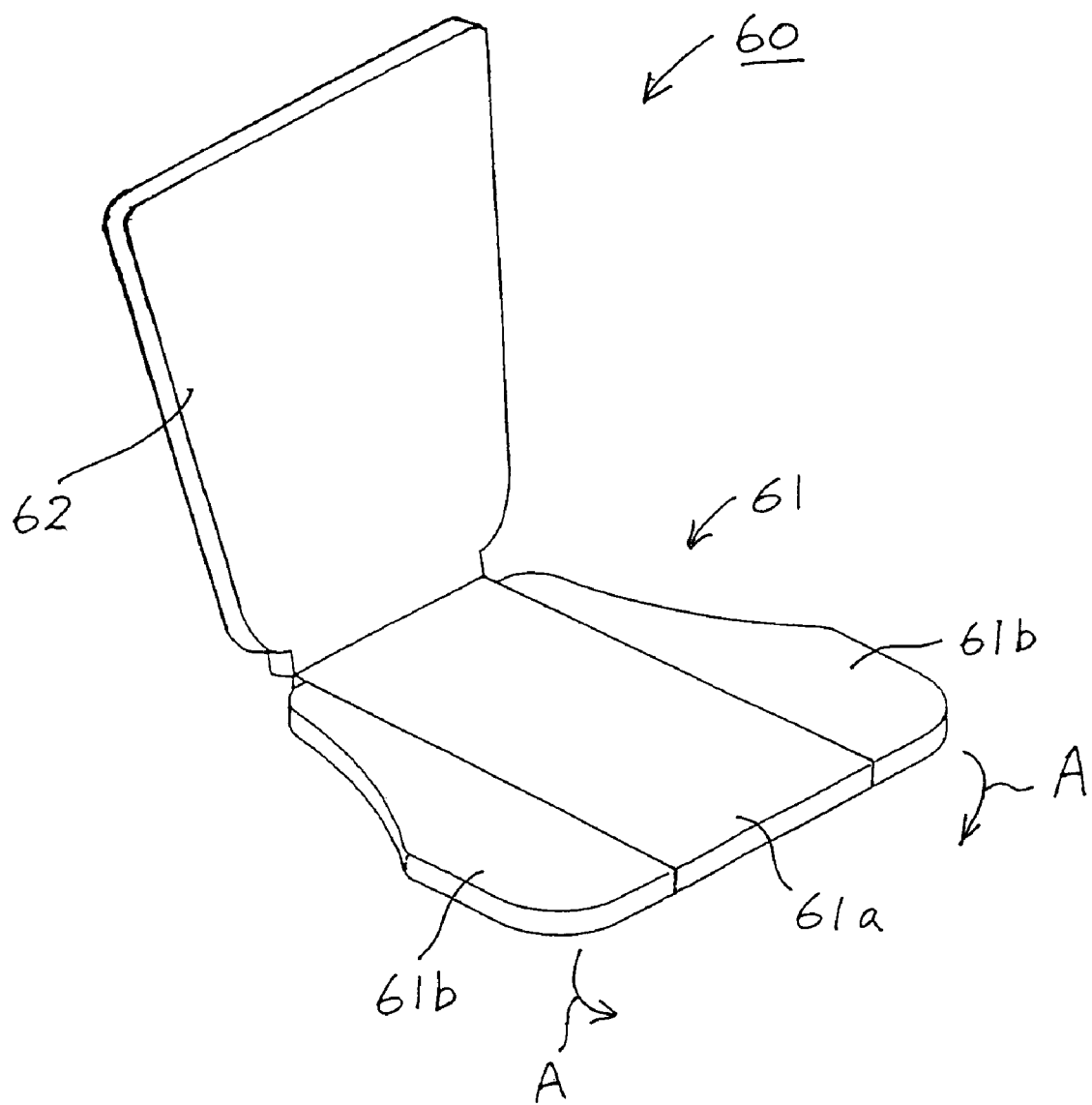
FIG. 9 is a perspective view showing a seating surface core.

The baby carriage preferably has a seat core 60 as shown in FIG. 9. The seat core 60 is mounted on a body of the baby carriage and comprises a seating surface core 61 and a backrest surface core 62 which are connected so as to be allowed to be bent. The seating surface core 61 has a center portion 61a and a pair of side portions 61b which are connected so as to be allowed to be bent, so that the dimension in the width direction can be reduced at the time of folding operation. The pair of side portions 61b are turned in the direction shown by an arrow A in the drawing when the baby carriage is folded.

Figure 10:
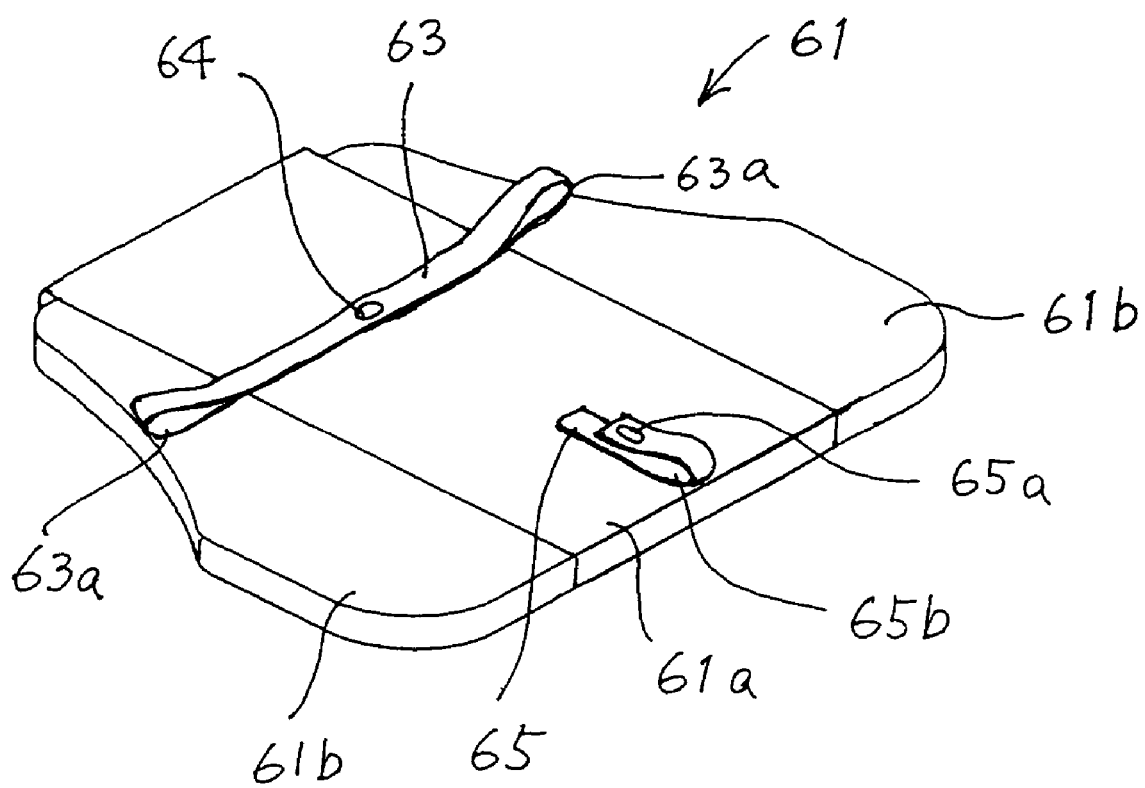
FIG. 10 is a perspective view showing a back surface of the seating surface core.

FIG. 10 shows a back i.e. bottom surface of the seating surface core 61. As shown in FIG. 10, a rear belt 63 and a front belt 65 are mounted on the back or bottom surface of the seating surface core 61. The rear belt 63 is mounted on the seating surface core 61 through, a rivet 64, for example and has loop portions 63a at both sides thereof. The front belt 65 is also mounted on the seating surface core 61 through a rivet, for example and forms a loop portion 65b by fastening a set button 65a.

Figure 11:
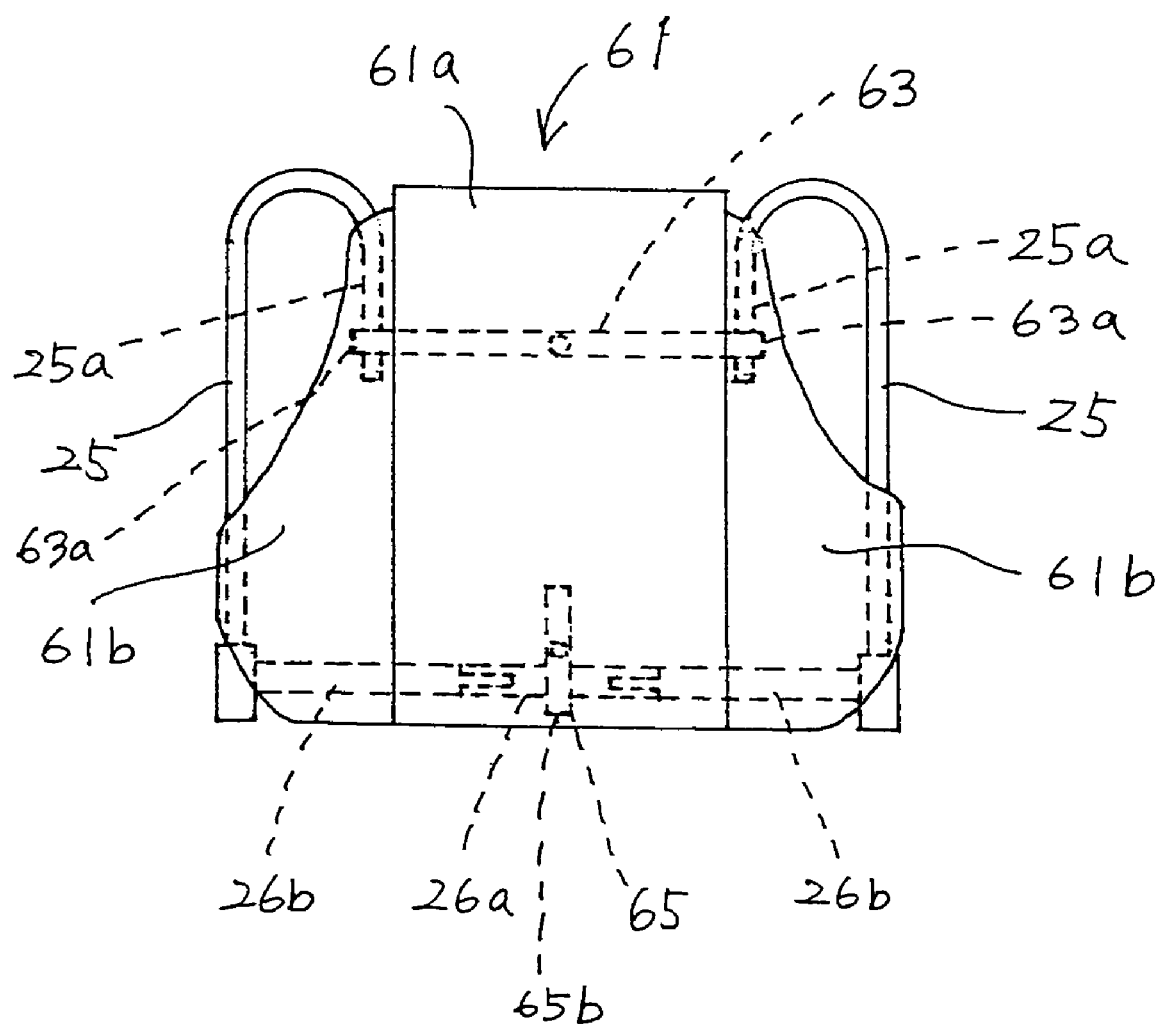
FIG. 11 is a plan view showing a mounted state of the seating surface core and a pair of seating surface supporting side bars.

FIG. 11 is a plan view showing a mounted state of the seating surface core 61 and the seating surface supporting side bar 25. As shown in FIG. 11, the inward extending portions 25a of the pair of seating surface supporting side bars 25 are inserted into the loop portions 63a positioned at both side ends of the rear belt 63, and the center link bar 26a of the bending link member 26 is inserted into the loop portion 65a of the front belt 65.

As described above, the seating surface core 61 is connected to the pair of seating surface supporting side bars 25 through a belt, for example and the seating surface core 61 is stably supported by the pair of inward extending portions 25a from beneath, whereby the position of the seating surface formed by the seating surface core 61 can be surely stabilized.

Although one embodiment of the present invention was described with reference to the drawings, the above described and illustrated embodiment only shows the present invention illustratively. Therefore, various kinds of modifications and variations can be added within the same scope or an equivalent scope as in the present invention. Some of them are illustratively listed and described hereinafter.

(1) According to the illustrated embodiment, the inward extending portion which stably supports the rear portion of the seating surface was formed by bending the rear end portion of the seating surface supporting side bar in the shape of horseshoe. However, the present invention is not limited to the shape of horseshoe and various configurations can be applied as long as they extend toward the inside and can support the seating surface from beneath.

(2) The inward extending portion may be constituted by a member different from that of the seating surface supporting side bar. In this case, it is preferable that the inward extending portion is integrally fixed to the seating surface supporting side bar.

What is claimed is:
1. A folding baby carriage that is foldable from an opened state to a folded state so as to be reduced in dimension in a width direction, comprising a pair of seating surface supporting side bars and a seating surface member mounted and supported on said side bars, wherein each one of said side bars respectively includes a side bar portion extending back and forth along a respective side of said seating surface member and supporting said seating surface member from beneath, wherein each one of said side bars respectively further includes a rigid inward extending portion extending from a rear portion of said side bar laterally inwardly in said width direction toward the other one of said side bars and supporting said seating surface member from beneath, and wherein said rigid inward extending portions respectively terminate laterally inwardly at respective unsupported free distal ends that are not connected to each other, and said rigid inward extending portions have a lateral space therebetween in said width direction in said opened state.

2. The folding baby carriage according to claim 1, wherein said inward extending portions are respectively integral unitary portions of said side bars integrated with said side bar portions.

3. The folding baby carriage according to claim 1, wherein each one of said inward extending portions is respectively formed by bending a rear end portion of a respective one of said seating surface supporting side bars laterally inwardly in the shape of a horseshoe.

4. The folding baby carriage according to claim 1, further comprising:
- a rear leg having a rear wheel;
- an inverting member that is turnably connected to said rear leg through a connection pin, and that is located along said rear leg above said connection pin in said opened state, and that is located along said rear leg below said connection pin in said folded state; and
- a connection member turnably connected to said inverting member;
- wherein said seating surface supporting side bar and said connection member are fixed, and
- a portion of said seating surface supporting side bar extending backward beyond said connection member is bent in the shape of a horseshoe to form said inward extending portion.

5. The folding baby carriage according to claim 1, wherein said lateral space between said pair of inward extending portions in said opened state has a dimension corresponding to a distance in which said pair of seating surface supporting side bars approach each other in accordance with a folding operation from said opened state to said folded state.

6. The folding baby carriage according to claim 1, wherein said seating surface member comprises a plate-shaped seating surface core connected to said pair of seating surface supporting side bars.

7. The folding baby carriage according to claim 6, wherein said seating surface core is connected to said inward extending portions of said pair of seating surface supporting side bars.

8. The folding baby carriage according to claim 6, wherein said seating surface core and said pair of seating surface supporting side bars are connected through a belt.

9. The folding baby carriage according to claim 6, further comprising a bending link member connecting front portions of said pair of seating surface supporting side bars, wherein said bending link member has a center link bar and a pair of side link bars provided so as to allow said bending link member to be bent, and said seating surface core is further connected to said center link bar.

* * * * *

UNITED STATES PATENT AND TRADEMARK OFFICE
CERTIFICATE OF CORRECTION

PATENT NO. : 7,140,634 B2  
APPLICATION NO. : 10/753095  
DATED : November 28, 2006  
INVENTOR(S) : Kassai et al.

Page 1 of 1

It is certified that error appears in the above-identified patent and that said Letters Patent is hereby corrected as shown below:

Column 4,  
Line 11, after "bars 25.", insert a paragraph break;  
Line 63, after "bar 25.", replace "AS" by --As--;  
Line 65, after "portion", replace "25awhich" by --25a which--;

Column 5,  
Line 8, after "in the", replace "Beat" by --seat--.

Signed and Sealed this

Fifteenth Day of May, 2007

JON W. DUDAS  
*Director of the United States Patent and Trademark Office*